United States Patent
Branton et al.

(10) Patent No.: US 9,642,394 B2
(45) Date of Patent: May 9, 2017

(54) POROUS CARBON AND METHODS OF PRODUCTION THEREOF

(75) Inventors: Peter Branton, London (GB); Bertram Bohringer, Erkrath (DE); Sven Fichtner, Erkrath (DE); Jann-Michael Giebelhausen, Erkrath (DE)

(73) Assignee: BRITISH AMERICAN TOBACCO (INVESTMENTS) LIMITED, London (GB)

( * ) Notice: Subject to any disclaimer, the term of this patent is extended or adjusted under 35 U.S.C. 154(b) by 0 days.

(21) Appl. No.: 14/233,950

(22) PCT Filed: Jul. 18, 2012

(86) PCT No.: PCT/GB2012/051718
§ 371 (c)(1),
(2), (4) Date: Apr. 17, 2014

(87) PCT Pub. No.: WO2013/011312
PCT Pub. Date: Jan. 24, 2013

(65) Prior Publication Data
US 2014/0216487 A1    Aug. 7, 2014

(30) Foreign Application Priority Data

Jul. 21, 2011   (GB) .................................. 1112539.0
Aug. 11, 2011   (GB) .................................. 1113839.3

(51) Int. Cl.
*A24D 3/02*   (2006.01)
*A24D 3/06*   (2006.01)
(Continued)

(52) U.S. Cl.
CPC ........... *A24D 3/163* (2013.01); *A24D 3/0287* (2013.01); *A24D 3/066* (2013.01); *A24D 3/16* (2013.01);
(Continued)

(58) Field of Classification Search
USPC ........................... 131/331, 341, 342; 493/39
See application file for complete search history.

(56) References Cited

U.S. PATENT DOCUMENTS 2,963,441 A  * 12/1960  Dolian et al. ................. 252/190
3,251,365 A     5/1966   Bates
(Continued)

FOREIGN PATENT DOCUMENTS

BE       686826 A      2/1967
CN    101085424 A     12/2007
(Continued)

OTHER PUBLICATIONS

Material Safety Data Sheet for Zinc Nitrate, Mallinckrodt Baker, Inc., 2007, 6 pages, [online], retrieved from the Internet, [retrieved Oct. 20, 2015], <URL: http://www.ch.ntu.edu.tw/~genchem99/msds/exp4/Zn(NO3)2.pdf>.*

(Continued)

*Primary Examiner* — Dennis Cordray
(74) *Attorney, Agent, or Firm* — Cantor Colburn LLP (57) ABSTRACT

Embodiments of the invention relate to porous carbon and methods of preparing porous carbon. In some embodiments, the prepared porous carbon exhibits enhanced selectivity for hydrogen cyanide (HCN), In one embodiment, the method comprises impregnating activated carbon with a metal oxide, such as zinc oxide. The carbon is suitable for use in smoke filtration.

15 Claims, 3 Drawing Sheets

(51) Int. Cl.
*A24D 3/16* (2006.01)
*B01J 20/20* (2006.01)
*B01J 20/32* (2006.01)
*C01B 31/08* (2006.01)

(52) U.S. Cl.
CPC .......... *B01J 20/20* (2013.01); *B01J 20/3204* (2013.01); *B01J 20/3236* (2013.01); *C01B 31/083* (2013.01)

(56) References Cited

U.S. PATENT DOCUMENTS

| | | |
|---|---|---|
| 3,355,317 A | 11/1967 | Bates |
| 3,460,543 A | 8/1969 | Bates |
| 3,693,632 A | 9/1972 | Tolman |
| 4,091,822 A | 5/1978 | Ihrig |
| 4,221,226 A | 9/1980 | Kiefer |
| 5,105,836 A | 4/1992 | Gentry |
| 5,275,859 A | 1/1994 | Phillips |
| 6,344,071 B1 | 2/2002 | Smith |
| 2003/0000538 A1 | 1/2003 | Bereman |
| 2003/0100635 A1 | 5/2003 | Chen |
| 2004/0250827 A1 | 12/2004 | Deevi |
| 2005/0000529 A1 | 1/2005 | Bereman |
| 2005/0000531 A1 | 1/2005 | Shi |
| 2005/0133054 A1 | 6/2005 | Fournier |
| 2006/0201524 A1 | 9/2006 | Zhang |
| 2006/0289024 A1 | 12/2006 | Deevi |
| 2007/0215166 A1 | 9/2007 | Branton |
| 2008/0236602 A1 | 10/2008 | Bereman |
| 2008/0245376 A1 | 10/2008 | Travers |
| 2008/0293565 A1* | 11/2008 | Warburton .................... 502/401 |
| 2010/0108083 A1 | 5/2010 | Schwartz |
| 2010/0122515 A1* | 5/2010 | Kuo et al. ...................... 55/524 |
| 2010/0122708 A1 | 5/2010 | Sears |
| 2010/0125039 A1 | 5/2010 | Banerjee et al. |
| 2012/0172216 A1* | 7/2012 | Bohringer et al. ........... 502/416 |

FOREIGN PATENT DOCUMENTS

| | | |
|---|---|---|
| CN | 101150965 A | 3/2008 |
| CN | 101524186 A | 9/2009 |
| EP | 0250806 A | 1/1988 |
| EP | 1474008 A1 | 11/2004 |
| GB | 437039 A | 10/1935 |
| GB | 973854 A | 10/1964 |
| GB | 1188874 A | 4/1970 |
| GB | 1200219 A | 7/1970 |
| GB | 1331096 A | 9/1973 |
| GB | 1334861 A | 10/1973 |
| GB | 1342931 A | 1/1974 |
| GB | 1354362 A | 6/1974 |
| GB | 1400197 A | 7/1975 |
| GB | 1458480 A | 12/1976 |
| WO | 9205713 A1 | 4/1992 |
| WO | 9310896 A1 | 6/1993 |
| WO | 03053177 A1 | 7/2003 |
| WO | 03092416 A1 | 11/2003 |
| WO | 2004110186 A1 | 12/2004 |
| WO | 2004110190 A2 | 12/2004 |
| WO | 2005039333 A1 | 5/2005 |
| WO | 2005094619 A1 | 10/2005 |
| WO | 2005112671 A1 | 12/2005 |
| WO | 2005118133 A2 | 12/2005 |
| WO | 2006070291 A2 | 7/2006 |
| WO | 2006090290 A1 | 8/2006 |
| WO | 2006097852 A1 | 9/2006 |
| WO | 2007026131 A1 | 3/2007 |
| WO | 2007072231 A2 | 6/2007 |
| WO | 2007083245 A2 | 7/2007 |
| WO | 2007096785 A2 | 8/2007 |
| WO | 2008110233 A1 | 9/2008 |
| WO | 2009077179 A2 | 6/2009 |
| WO | 2009123023 A1 | 10/2009 |
| WO | 2009129255 A2 | 10/2009 |
| WO | 2009147515 A1 | 12/2009 |
| WO | 2010027991 A2 | 3/2010 |
| WO | 2010059488 A1 | 5/2010 |
| WO | 2010059607 A1 | 5/2010 |

OTHER PUBLICATIONS

International Search Report, mailed Nov. 14, 2012, for International Patent Application No. PCT/GB2012/051718, filed Jul. 18, 2012.
Written Opinion, mailed Jul. 18, 2013, for International Patent Application No. PCT/GB2012/051718, filed Jul. 18, 2012.
Second Written Opinion of International Patent Application No. PCT/GB2012/051718, filed Jul. 18, 2012, mailed Nov. 14, 2012.
International Preliminary Report on Patentability, mailed Nov. 8, 2013, for International Patent Application No. PCT/GB2012/051718, filed Jul. 18, 2012.
Byrappa K et al., Journal of Materials Science, Kluwer Academic Publishers, vol. 41, No. 5, Mar. 1, 2006, pp. 1355 to 1362.
M. Mola, et al., Adsorption (2008), vol. 14, Issue 2-3, pp. 335-341.
Byrappa K et al., "Impregnation of ZnO onto activated carbon under hydrothermal conditions and its photocatalytic properties," Journal of Materials Science, vol. 41, No. 5, Mar. 1, 2006, pp. 1355 to 1362.
M. Mola, et al., "The characterisation and evaluation of activated carbon in a cigarette filter," Adsorption (2008), vol. 14, Issue 2-3, pp. 335-341.

\* cited by examiner

POROUS CARBON AND METHODS OF PRODUCTION THEREOF

CLAIM FOR PRIORITY

This application is a National Stage Entry entitled to and hereby claiming priority under 35 U.S.C. §§365 and 371 to corresponding PCT Application No. PCT/GB2012/051718, filed Jul. 18, 2012, which in turn claims priority to GB Application No. 1112539.0, filed Jul. 21, 2011 and GB Application No. 1113839.3, filed Aug. 11, 2011. The entire contents of the aforementioned applications are herein expressly incorporated by reference.

FIELD OF THE INVENTION

Embodiments of the invention relate to porous carbon and methods of preparing porous carbon. In some embodiments, the porous carbon is impregnated with a metal oxide and/or exhibits enhanced selectivity for hydrogen cyanide (HCN). The porous carbon of the invention may be particularly useful for smoke filtration in smoking articles, as it provides improved adsorption of the aforementioned smoke vapour phase constituent.

BACKGROUND TO THE INVENTION

Filtration is used to reduce certain particulates and/or vapour phase constituents of tobacco smoke inhaled during smoking.

Smoking article filters may include porous carbon materials to adsorb certain smoke constituents, typically by physisorption. Such porous carbon materials can be made from the carbonized form of many different naturally occurring organic materials. Alternatively, synthetic carbons can be used, such as resins prepared by polycondensation reactions.

It can be important that the filtration of particulates and/or vapour phase constituents of tobacco smoke is achieved selectively, for instance without removing significant levels of other components.

SUMMARY

According to a first aspect of embodiments of the invention there is provided a method of preparing porous carbon, the method comprising impregnating activated carbon with metal oxide.

According to a second aspect, a porous carbon is provided which is obtained or obtainable by a method according to the first aspect of the invention.

According to a third aspect, a porous carbon is provided comprising activated carbon impregnated with metal oxide.

According to a fourth aspect, a filter element for a smoking article is provided, comprising a porous carbon according to the second or third aspects of the invention.

According to a fifth aspect, a smoking article is provided, comprising a porous carbon according to the second or third aspects of the invention.

BRIEF DESCRIPTION OF THE DRAWINGS

Embodiments of the invention are described below, for the purposes of example only, with reference to the accompanying drawings, in which.

DETAILED DESCRIPTION

The present invention relates to a method involving the application of metal salt to activated carbon so that the carbon becomes impregnated with metal oxide and, as a result, a porous carbon with enhanced adsorbent properties is produced.

Porous carbons may be produced from materials including coconut shell, plant-based materials, wood powder, peat, bone, coal tar, resins and related polymers. Alternative sources of microporous carbon are synthetic carbons, such as those formed by a polymerisation reaction, such as resin-based synthetic carbons. Such carbons may, for example, be prepared by polycondensation of an aldehyde and a phenol. The physical properties of synthetic carbons may be controlled during manufacturing, allowing them to be tailored to provide desired filtration characteristics.

The performance and suitability of porous carbon material as an adsorbent in different environments is determined by various physical properties of the material, including the shape and size of the particles, the pore size, the surface area of the material, and so on. These various parameters may be controlled by manipulating the process and conditions by which the porous carbon is produced.

In some embodiments, the larger the surface area of a porous material, the greater is the adsorption capacity of the material. However, as the surface area of the material is increased, the density and the structural integrity are reduced. Furthermore, while the surface area of a material may be increased by increasing the number of pores and making the pores smaller, as the size of the pores approaches the size of the target molecule, it is less likely that the target molecules will enter the pores and adsorb to the material. This is particularly true if the material being filtered has a high flow rate relative to the activated carbon material, as is the case in a smoking article.

The method used to manufacture porous carbon material has a strong influence on its properties. International publication number WO2008/110233 and *Adsorption* (2008) 14: 335-341, provide more detail.

As discussed herein, pores in an adsorbent material that are less than 2 nm in diameter are referred to as "micropores", pores having diameters of between 2 nm and 50 nm are referred to as "mesopores", and pores having diameters exceeding 50 nm may be referred to as "macropores". Pores having diameters greater than 500 nm do not usually contribute significantly to the adsorbency of porous materials.

Traditionally, there are some smoke vapour constituents that exhibit relatively lower levels of adsorption and these include hydrogen cyanide (HCN). The presence of different compounds on the surface of the porous carbon material may also affect the carbon's adsorption properties.

According to one embodiment, the present invention seeks to provide a method for preparing porous carbon having enhanced selective adsorption of HCN.

In one embodiment of the invention, the porous carbon is a carbonised form of an organic material, such as coconut shell.

In another embodiment of the invention, the porous carbon is a resin-based synthetic carbon, such as a carbon prepared by polycondensation of an aldehyde and a phenol to form a resin, which is then carbonised. Commercially available polycondensates may be used.

In a further embodiment of the invention, the porous carbon is produced using sulfonated styrene-divinylbenzene copolymers, particularly sulfonated divinylbenzene-crosslinked polystyrenes, preferably in grain form, more preferably in spherical form. The divinylbenzene content of the sulfonated styrene-divinylbenzene copolymers used as starting materials should particularly be in the range from 1 to 20% by weight, particularly 1 to 15% by weight, preferably 2 to 10% by weight, based on the styrene-divinylbenzene copolymers. The starting copolymers can in principle be selected from the gel type or else from the macroporous type. When unsulfonated starting materials are used, the sulfonation can be carried out in situ (in particular before and/or during the carbonization), particularly using methods known per se to one skilled in the art, preferably by means of sulfuric acid and/or oleum and/or $SO_3$; this is familiar per se to one skilled in the art. Starting materials which have proven particularly advantageous are the gel-form or macroporous types of the corresponding ion exchange resins or of the corresponding unsulfonated precursors of ion exchange resins which still have to be sulfonated.

Carbonization of the aforementioned organic polymeric grains, in particular polymeric spherules, based on styrene and divinylbenzene which comprise sulfonic acid groups leads to the detachment of the sulfonic acid groups during the carbonization to free radicals and thus to crosslinks without which there would be no pyrolysis residue (=carbon). In general, the carbonization is carried out under an inert atmosphere (for example nitrogen) or at most at a slightly oxidizing atmosphere. It can similarly be advantageous for the inert atmosphere of the carbonization, in particular if it is carried out at comparatively high temperatures (for example in the range from about 500 to 650° C.) to be admixed with a minor amount of oxygen, in particular in the form of air (for example 1 to 5%) in order that an oxidation of the carbonized polymeric skeleton may be effected and the subsequent activation may thereby be facilitated. In general, the carbonization is carried out at temperatures of 100 to 950° C., particularly 150 to 900° C., preferably 300 to 850° C. The total duration of the carbonization is approximately 30 minutes to approximately 10 hours, particularly approximately 1 hour to approximately 6 hours.

Following the carbonization, the carbonized intermediate product is subjected to activation. Activation in an atmosphere comprising water vapour can be used to produce a microporous material. A second activated step in an atmosphere comprising $CO_2$ can be used to yield a material containing mesopores and macropores in addition to micropores.

The general procedure is for the first activating step to be carried out at temperatures of 700 to 1300° C., particularly 800 to 1200° C., preferably 850 to 950° C., and/or for a duration of 5 to 24 hours, preferably 5 to 15 hours, particularly 6 to 12 hours. Usually, the duration of the first activation stage can be controlled as a function of the attainment of a predetermined iodine number; for example, the first activation stage can be carried out to attainment of an iodine number of at least 1000 mg/g, particularly at least 1250 mg/g. The atmosphere of the first activation stage comprises water vapour, particularly a mixture of water vapor/inert gas, preferably a mixture of water vapour/nitrogen, or consists thereof. For the aforementioned reasons, the presence of activating gases other than water vapor, particularly the presence of carbon oxides ($CO_2$ for example), oxygen and/or ammonia, may be foreclosed in the context of the first activation stage. Good results are obtained when the throughput or to be more precise the amount of water vapour used is 25 to 350 l/h, particularly 50 to 300 l/h, reckoned as water (i.e., liquid water at 25° C. and under atmospheric pressure). Depending on the amount of starting material to be activated, the amount used or the mass-based throughput of water vapour should advantageously be 0.01 to 50 l/(h·kg), particularly 0.02 to 25 l/(h·kg), preferably 0.02 to 5 l/(h·kg), reckoned as water (i.e., liquid water at 25° C. and under atmospheric pressure) and based on starting material to be activated with water vapour.

The general procedure for the second activating step is for the second activating step to be carried out at temperatures of 700 to 1300° C., particularly 800 to 1200° C., preferably 850 to 950° C., and/or for a duration of 1 to 10 hours, particularly 3 to 8 hours. The atmosphere of the second activation stage comprises $CO_2$, particularly pure $CO_2$ or a mixture of $CO_2$/inert gas, particularly a mixture of $CO_2$/nitrogen, or consists thereof, and pure carbon dioxide is particularly preferred. For the aforementioned reasons, the presence of activating gases other than $CO_2$, in particular the presence of water vapour, may be foreclosed in the context of the second activation stage. Good results are obtained when the throughput or the amount used of $CO_2$ is 10 to 250 m³/h, particularly 20 to 200 m³/h (based on pure $CO_2$). Depending on the amount of starting material to be activated, the amount used or the mass-based throughput of $CO_2$ should advantageously be 0.001 to 100 m³/(h·kg), particularly 0.01 to 50 m³/(h·kg), preferably 0.05 to 10 m³/(h·kg), reckoned as pure gaseous $CO_2$ under activating conditions, particularly at the respective pressure and the respective temperature, which are selected for the activation, and based on starting material to be activated with $CO_2$. The process can be carried out such that the first and second activation stages merge into each other (for example by changing the activating atmosphere within the same apparatus).

Material produced according to the method of some embodiments of the invention will have particles that are small enough to provide a large surface area for smoke filtration. According to some implementations, the particles of activated carbon material are large enough that the smoke drawn through the filter is not restricted. In some implementations, the particles are large enough that they will not become entrained in the smoke and drawn through the filter to be inhaled by the smoker.

In some implementations, the fragment size may be configured such that the surface area to volume ratio of the fragments will not reduce the filtration efficiency.

Taking these factors into account, the spherical, activated carbon used in some embodiments may have a particle size in the range of from 100 μm to 1500 μm. The activated carbon used in embodiments of the invention may, for instance, have a particle size which lies within a range, the upper and lower limits of which are defined by any two of the following values that differ from each other, namely 100, 200, 300, 400, 500, 600, 700, 800, 900, 1000, 1100, 1200, 1300, 1400, 1500 μm. Preferably the mean particle size is between 200 μm and 800 μm, and more preferably between 250 μm and 600 μm.

The surface areas of activated carbon materials are estimated by measuring the variation of the volume of nitrogen adsorbed by the material in relation to the partial pressure of nitrogen at a constant temperature. Analysis of the results by mathematical models originated by Brunauer, Emmett and Teller results in a value known as the BET surface area.

The BET surface area of the activated carbon materials used in some embodiments of the present invention is ideally at least 800 $m^2/g$, preferably at least 900 $m^2/g$, and desirably at least 1000, 1100, 1150, 1200, 1250, 1300, or 1350 $m^3/g$. Typical values for BET surface area of carbon materials produced by the method of the invention are up to about 1000, 1050, 1100, 1150, 1200, 1250, 1300, 1400, 1500, 1600, 1700, 1800, or 1900 $m^2/g$. Porous carbon materials with BET surface areas of between 1000 $m^2/g$ and 1800 $m^2/g$ are preferred, and material with surface areas of between 1200 $m^2/g$ and 1600 $m^2/g$ are most preferred. However, the impregnation according to the present invention can work even for activated carbon with a low surface area, for instance down to 450 $m^2/g$.

The relative volumes of micropores, mesopores and macropores in an activated carbon material can be estimated using well-known nitrogen adsorption and mercury porosimetry techniques. Mercury porosimetry can be used to estimate the volume of mesopores and macropores. Nitrogen adsorption can be used to estimate the volumes of micropores and mesopores, using the so-called BJH mathematical model. However, since the theoretical bases for the estimations are different, the values obtained by the two methods cannot generally be compared directly with each other.

The method of the invention can use an activated carbon material having any pore structure that is generally suitable for smoke filtration, i.e. it may include micropores, mesopores or macropores, or any combination thereof.

In some suitable carbon materials of embodiments of the present invention, at least 20% but desirably no more than 65% of the pore volume (as estimated by nitrogen adsorption) is in mesopores. Typical minimum values for the volume of mesopores as a percentage of the combined micropore and mesopore volumes of the carbon materials of the invention are 25%, 35%, or 45%. Typical maximum values for such volumes are 55%, 60%, or 65%. Preferably the mesopore volume of the carbon materials of the invention is in the range of between 25% and 55% of the combined mesopore and micropore volume. The activated carbon used in some embodiments typically has at least 35% of its total pore volume formed by mesopores.

The micopore:(mesopore+macropore) volume ratio of activated carbon having micropores, mesopores and macropores may be such that the carbon has at least 30% of its pore volume in micopores, for instance from 30% to 90%, or more particularly from 50% to 90%, from 70% to 90% or approximately 80%.

The porous carbon materials used in some embodiments may have a pore volume (as estimated by nitrogen adsorption), for instance micropore volume, of at least 0.4 $cm^3/g$, and desirably at least 0.5, 0.6, 0.7, 0.8, or 0.9 $cm^3/g$. Carbon materials with pore volumes of at least 0.5 $cm^3/g$ are particularly useful as an adsorbent for tobacco smoke. Carbon materials with pore volumes significantly higher than the preferred values may be low in density, and are therefore less easy to handle in cigarette production equipment. Such carbon materials are less favourable for use in cigarettes or smoke filters for that reason.

The pore structure and density of activated carbon material are closely related. Generally, the greater the pore volume of the material, the lower is the density.

Activated carbon materials used in the invention preferably have bulk densities greater than 0.25 $g/cm^3$, and preferably greater than 0.3 $g/cm^3$. The activated carbon material may have a bulk density of up to 0.7 $g/cm^3$, 0.6 $g/cm^3$, or 0.5 $g/cm^3$.

An aqueous solution of a metal salt may be used in the present invention. This solution can be applied to the carbon by dip impregnation, spraying, or soaking (incipient wetness). After application, the sample is dried, for example at a temperature between 70 to 90° C. for 2 to 24 hours. Afterwards, the sample is thermally treated in an oven under a nitrogen atmosphere to thermally decompose the metal salt. The nitrogen volume stream may be between 250 to 750l/hour, preferably between 400 to 600l/hour, most preferably about 500l/hour. The temperature program may start at 5, 10, 15, 20 25, 30, 35, 40, 45, 50° C. and with 1, 2, 3, 5, 6, 8, 10, 12, 14, 16K/minute, with the temperature being increased up to 550° C., preferably up to 450° C. and more preferably up to 350° C. The temperature is kept at the aforementioned temperature for one to six, preferably two to four, or even more preferably three hours before the material may be cooled down and ready to use.

In one embodiment of the invention, the porous carbon is not washed after application of the metal salt to remove excess salt.

The resulting carbon is impregnated with at least 0.25% but desirably no more than 20% metal oxide by weight of carbon. The activated carbon used in embodiments of the invention may, for instance, be impregnated with upper and lower limits of metal oxide defined by any two of the following values that differ from each other, namely 0.25, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20%. Typically, about 1%, 3%, 5% or 10% metal oxide by weight of carbon is impregnated. Typical values are between 0.25% or 5%, preferably from 0.5% to 5% metal oxide by weight of carbon is impregnated.

Impregnating more metal oxide can result in a lowering of the surface area. The pores may, for instance, be over filled with oxide leaving less space for smoke, which could cause a reduction in the adsorption of other vapour phase constituents.

Without being bound by theory, it is thought that the metal oxide is able to bind to the HCN (ZnO+2HCN→Zn(CN)$_2$+ H$_2$O) thereby filtering it out of smoke, particularly mainstream smoke that is inhaled during smoking. This advantageously does not result in the production of cyanogen $(CN)_2$, or does not result in the production of a substantial amount of cyanogen $(CN)_2$. For example, any production of cyanogen may be below levels detectable by known techniques.

Above is described what are believed to be the preferred embodiments of the invention. However, those skilled in the art will recognise that changes and modifications may be made without departing from the scope of the invention.

Examples

Activated Carbon

In one example, the activated carbon of high meso- and macro-porosity used is characterized by a spherical shape and size between 0.25 and 0.6 mm; at least 35% of the total pore volume being formed by pores having a diameter of more than 20 Å; and a BET surface area of at least 1250 m²/g.

In one example, the activated carbon is obtained by a process comprising two-stage activation using steam and subsequent carbon dioxide activation and is referred to as product no. 100797 from Blücher GmbH. See International publication number WO2008/110233, where this process is described in further detail.

In addition to the aforementioned properties above, the activated carbon used in the embodiments of the present invention has excellent abrasion and bursting resistance, so that it is useful in a multiplicity of different applications.

Zinc Oxide Impregnation by the Incipient Wetness Technique 75 g of polymer based activated carbon (product no. 100797 from Blücher GmbH) is dip impregnated for two hours in an aqueous solution of zinc nitrate ($Zn(NO_3)_2 \cdot 6H_2O$). 2.75 g of zinc nitrate is dissolved in 220 ml of distilled water. After dip impregnation the sample is dried at 80° C. for >12 hours. Afterwards the sample is thermally treated in an oven under nitrogen atmosphere to thermally decompose the zinc nitrate. The nitrogen volume stream is about 500 l/hr. The temperature program starts at 25° C. and with 6K/min the temperature is increased up to 350° C. in one hour. The temperature is kept at 350° C. for three hours before the material is cooled down. The impregnated polymer based activated carbon was taken from the oven and directly used for all further experiments. The level of zinc oxide was 1% by weight of carbon. The characteristic adsorbent data for this product is listed in Table 1.

TABLE 1

| | |
|---|---|
| ZnO content (%). | 1 |
| Bulk Density (ASTM B527-93/00) [g/l] | 370 |
| SP BET (P/Po = 0.1) [m²/g] | 1520 |
| Total Pore Volume (Gurvich at 0.995) [cm³/g] | 1.07 |
| Micro Pore Volume (Carbon Black) [cm³/g] | 0.58 |

Figure 1:
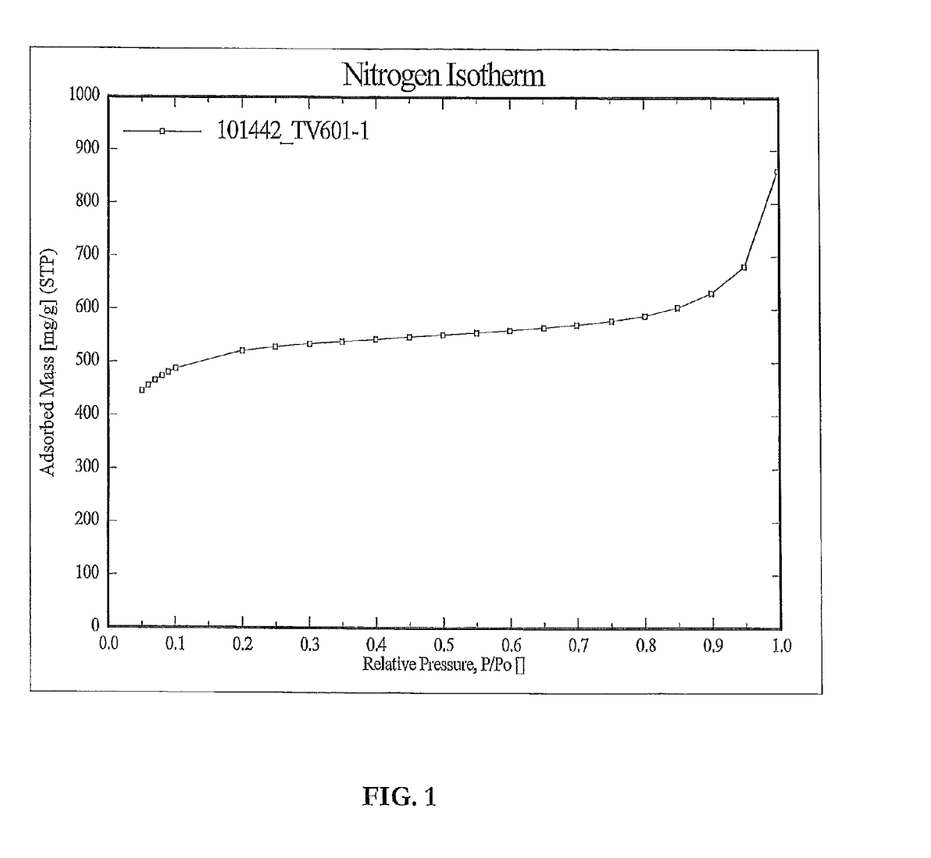
FIG. 1 shows the nitrogen isotherm of the porous carbon of 100797 containing 1% ZnO by weight.

FIG. 1 shows the nitrogen isotherm of 100797 impregnated with 1% ZnO 60 mg of carbon was inserted into a cavity filter of a reference cigarette. As a control and to allow percentage reductions in smoke components to be determined, a cigarette with empty filter cavity of similar dimensions was used.

Cigarettes were conditioned at 22° C. and 60% Relative Humidity for a period of three weeks prior to smoking under standard ISO smoking conditions (one 35 ml volume puff of 2 s durations taken every one minute). Smoke constituents including HCN were measured and results are shown in Table 2 using base carbon and carbon impregnated at levels of 1, 3, 5 and 10% ZnO. Cyanogen was not detected in the smoke.

TABLE 2

| Carbon content | None | 60 mg | 60 mg | 60 mg | 60 mg | 60 mg |
|---|---|---|---|---|---|---|
| Carbon description | — | 0% ZnO | 1% ZnO | 3% ZnO | 5% ZnO | 10% ZnO |
| Smoke yields | | | | | | |
| Puff No | 7.0 | 6.9 | 7.1 | 7 | 7.1 | 7 |
| NFDPM (mg/cig) | 11.1 | 9.6 | 9.7 | 9.9 | 9.5 | 9.7 |
| Nicotine | 0.93 | 0.86 | 0.89 | 0.89 | 0.85 | 0.87 |
| Water | 2.3 | 1.5 | 1.6 | 1.5 | 1.5 | 1.6 |
| CO | 11.5 | 11.4 | 11.4 | 10.9 | 10.9 | 11.4 |
| Acetaldehyde (ug/cig) | 525.7 | 229.4 | 231.8 | 259.1 | 309.6 | 353.1 |
| Acetone | 266.5 | 29.2 | 32.7 | 39.1 | 53 | 71.9 |
| Acrolein | 62.2 | 6.5 | 8 | 9 | 12.3 | 16.9 |
| Butyraldehyde | 33.8 | 2.7 | 2.8 | 2.5 | 5.9 | 8.15 |
| Crotonaldehyde | 19.4 | 1.2 | 1.1 | 1.1 | 1.7 | 2.2 |
| Formaldehyde | 36.7 | 18.9 | 19 | 18.9 | 17.7 | 20.3 |
| Methyl ethyl ketone | 64.6 | 4.0 | 4.1 | 5 | 7.8 | 10.8 |
| Propionaldehyde | 47.7 | 7.3 | 8.1 | 9.5 | 12.6 | 16.9 |
| HCN | 137.7 | 73.3 | 39.3 | 33 | 33.2 | 30.7 |
| 1,3-butadiene | 53.8 | 8.8 | 20.8 | 26.6 | 7.7 | 10.6 |

TABLE 2-continued

| | | | | | |
|---|---|---|---|---|---|
| Acrylonitrile | 13.7 | 1.9 | 2.7 | 2.7 | 1.5 | 1.6 |
| Benzene | 47.6 | 4.3 | 5.8 | 5.8 | 4.3 | 4.3 |
| Isoprene | 531.9 | 43.0 | 103.4 | 124.1 | 22.3 | 22.4 |
| % Reduction | | | | | | |
| Acetaldehyde (ug/cig) | | 56 | 56 | 51 | 41 | 33 |
| Acetone | | 89 | 88 | 85 | 80 | 73 |
| Acrolein | | 90 | 87 | 86 | 80 | 73 |
| Butyraldehyde | | 92 | 92 | 93 | 83 | 76 |
| Crotonaldehyde | | 94 | 94 | 94 | 91 | 89 |
| Formaldehyde | | 49 | 48 | 49 | 52 | 45 |
| Methyl ethyl ketone | | 94 | 94 | 92 | 88 | 83 |
| Propionaldehyde | | 85 | 83 | 80 | 74 | 65 |
| HCN | | 47 | 71 | 76 | 76 | 78 |
| 1,3-butadiene | | 84 | 61 | 51 | 86 | 80 |
| Acrylonitrile | | 86 | 80 | 80 | 89 | 88 |
| Benzene | | 91 | 88 | 88 | 91 | 91 |
| Isoprene | | 92 | 81 | 77 | 96 | 96 |

LOQ (Limit of Quantification)

In particular, the raw data presented in Table 2 when converted to percentages shows that the zinc oxide impregnated activated carbon prepared above with 1% zinc oxide impregnation, reduced the percentage of HCN in smoke by 71%, whereas the carbons with no zinc oxide impregnation only reduced the HCN by 47%. In addition, the carbons with 3%, 5% and 10% zinc oxide impregnation resulted in a 76, 76 and 78% reduction in HCN, respectively.

Figure 2:
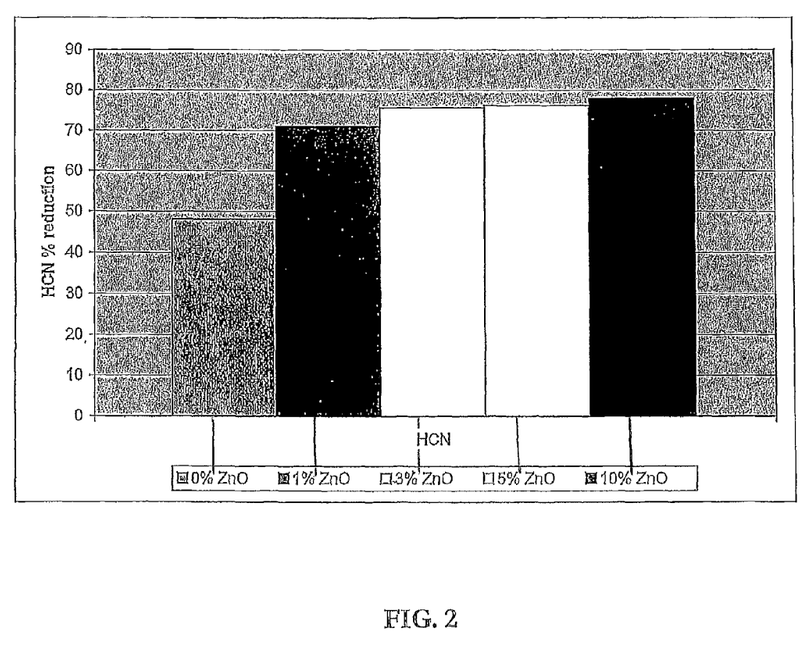
FIG. 2 illustrates graphically the percentage reduction of hydrogen cyanide in smoke achieved with activated carbon impregnated with zinc oxide (1%, 3%, 5% and 10% zinc oxide) versus activated carbon without zinc oxide.

Turning now to FIG. 2, the data presented therein correlates with the data in Table 2 and demonstrates that activated carbon impregnated with 1%, 3%, 5% and 10% zinc oxide by weight of carbon reduces HCN by 71, 76, 76 and 78%, respectively.

Figure 3:
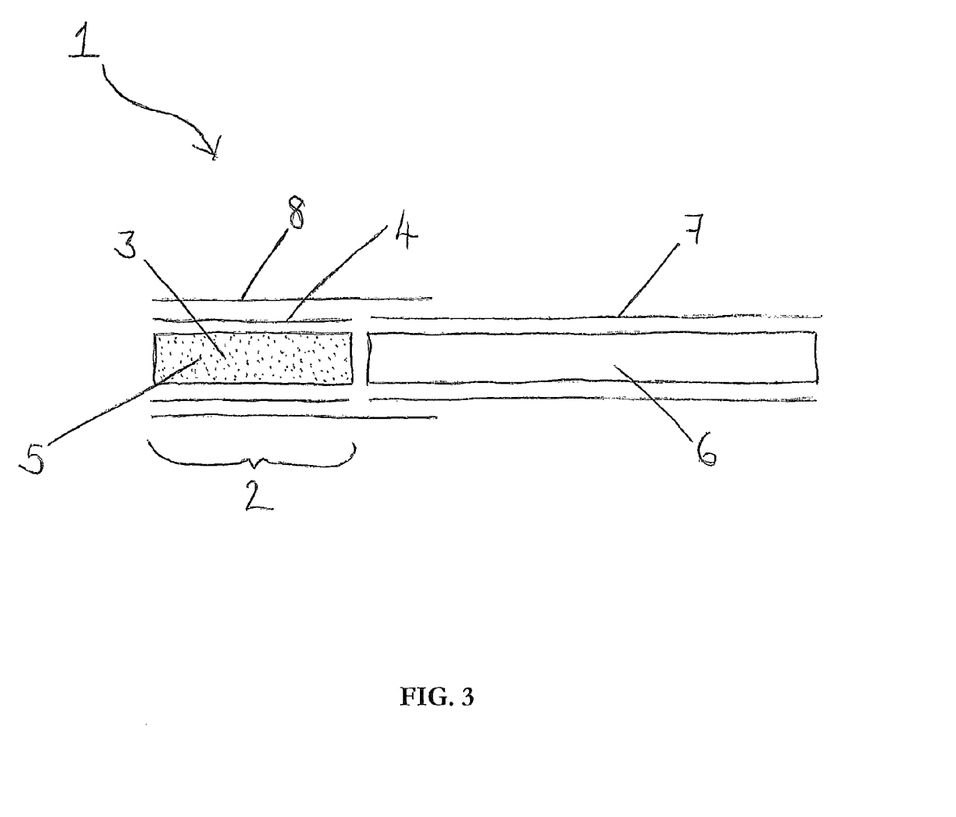
FIG. 3 illustrates the position of porous carbon granules according to embodiments of the present invention within a smoking article.

Referring to FIG. 3, a smoking article 1 is schematically illustrated comprising a filter section 2 having a substantially cylindrical plug of material 3 wrapped in a plug wrap 4 around its circumferential surface. The end faces of the plug of filter material 3 are left unwrapped. The filter material 3 can comprise cellulose acetate material, for instance in the form of fibres. The porous carbon granules 5 as described herein, for instance impregnated with metal oxide, according to the embodiments of the invention, can be dispersed within the filter material 3, resulting in a filter arrangement generally referred to a "Dalmatian" filter.

The filter section 2 may comprise a plurality of axially aligned sections, with each section comprising one or more of cellulose acetate, activated carbon, for instance granules 5 as described herein, and/or other additives such as flavourant. The filter section 2 may, alternatively, comprise porous carbon granules as described herein, according to embodiments of the invention, arranged in a filter cavity, for instance formed between two cellulose acetate filter elements.

A rod of smokable material 6 wrapped around its circumferential surface by a cigarette paper 7 is also provided. The filter section 2 is joined to the smokable material 6 using a tipping paper 8 to form the smoking article 1.

The filter material 3 and/or smokable material rod 6 can be ventilated, for instance using ventilation holes (not shown) provided in the tipping paper 8, plug wrap 4 and/or cigarette paper 7.

In summary, the Example indicates that applying zinc oxide to activated carbon according to a method of the invention provides porous carbon having enhanced adsorption of smoke vapour constituents, such as HCN, for instance when compared to porous carbon which has not been impregnated with zinc oxide.

The invention claimed is:

1. A method of enhancing the selectivity of porous carbon for hydrogen cyanide (HCN), the method comprising:
    impregnating activated carbon with zinc salt, the impregnating including at least one of: (1) dip impregnation with an aqueous solution of zinc salt, the solvent consisting of water, (2) spraying with an aqueous solution of zinc salt, the solvent consisting of water, or (3) soaking with an aqueous solution of zinc salt, the solvent consisting of water; and
    thermally treating the impregnated activated carbon to form porous carbon impregnated with zinc oxide, wherein the activated carbon has at least 30% of the pore volume as micropores, and wherein, when used in a smoking article filter, the porous carbon has an enhanced selectivity for HCN relative to the activated carbon without impregnation with zinc oxide.

2. The method as claimed in claim 1, wherein no cyanogen is formed as a by-product when the porous carbon is exposed to HCN.

3. The method as claimed in claim 1, wherein the activated carbon is a carbonised form of an organic material.

4. The method as claimed in claim 1, wherein the activated carbon is a resin-based synthetic carbon.

5. The method as claimed in claim 1, wherein the activated carbon has a pore volume of at least 0.4 cm$^3$/g.

6. The method as claimed in claim 5, wherein the activated carbon is a sulfonated copolymer-derived activated carbon.

7. The method as claimed in claim 1, wherein the zinc salt comprises zinc nitrate.

8. The method as claimed in claim 7, wherein the zinc salt consists of zinc nitrate.

9. A filter element for a smoking article comprising the porous carbon as claimed in claim 1.

10. A smoking article comprising the porous carbon as claimed in claim 1.

11. The method as claimed in claim 5, wherein the activated carbon is a sulfonated styrene-divinylbenzene copolymer-derived activated carbon.

12. The method as claimed in claim 1, wherein the impregnated metal oxide is between 0.5 and 10% by weight of activated carbon.

13. The method as claimed in claim 1, wherein the impregnated metal oxide is between 0.5 and 5% by weight of activated carbon.

14. The method as claimed in claim 1, wherein the activated carbon has a particle size of from 0.1 to 1.5 mm.

15. The method as claimed in claim 1, wherein the activated carbon has at least 20% to 65% of the pore volume as mesopores.

* * * * *